United States Patent
Yun

(10) Patent No.: US 9,300,016 B2
(45) Date of Patent: Mar. 29, 2016

(54) BATTERY SYSTEM AND ENERGY STORAGE SYSTEM

(71) Applicant: Samsung SDI Co., Ltd., Yongin-si, Gyeonggi-do (KR)

(72) Inventor: Han-Seok Yun, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 467 days.

(21) Appl. No.: 13/836,321

(22) Filed: Mar. 15, 2013

(65) Prior Publication Data

US 2014/0079960 A1    Mar. 20, 2014

Related U.S. Application Data

(60) Provisional application No. 61/701,134, filed on Sep. 14, 2012.

(51) Int. Cl.
*H02J 7/00* (2006.01)
*H01M 10/48* (2006.01)
*H02J 7/34* (2006.01)

(52) U.S. Cl.
CPC .............. *H01M 10/482* (2013.01); *H02J 7/34* (2013.01); *Y02E 60/60* (2013.01)

(58) Field of Classification Search
USPC ......... 320/116, 119, 118, 121, 134, 132, 128, 320/126
See application file for complete search history.

(56) References Cited

U.S. PATENT DOCUMENTS

| | | | |
|---|---|---|---|
| 9,018,905 B2* | 4/2015 | Lim et al. | 320/116 |
| 2007/0216354 A1* | 9/2007 | Taylor et al. | 320/128 |
| 2008/0258685 A1* | 10/2008 | Choy | 320/132 |
| 2009/0066291 A1* | 3/2009 | Tien et al. | 320/118 |
| 2009/0102424 A1 | 4/2009 | Tien et al. | |
| 2009/0146610 A1* | 6/2009 | Trigiani | 320/119 |
| 2010/0217552 A1* | 8/2010 | Hsu et al. | 702/63 |
| 2010/0295382 A1 | 11/2010 | Tae et al. | |
| 2011/0175574 A1* | 7/2011 | Sim et al. | 320/121 |
| 2012/0183813 A1 | 7/2012 | Kim | |
| 2014/0077768 A1* | 3/2014 | Jung | 320/134 |

FOREIGN PATENT DOCUMENTS

| | | |
|---|---|---|
| JP | 3405526 B2 | 3/2003 |
| KR | 10-2010-0069917 A | 6/2010 |
| KR | 10-2010-0098550 A | 9/2010 |
| KR | 10-0991084 B1 | 10/2010 |
| KR | 10-2010-0124499 A | 11/2010 |
| KR | 10-2012-0083850 A | 7/2012 |

OTHER PUBLICATIONS

Korean Notice of Allowance dated Dec. 9, 2014 for co-pending KR 10-2013-0073308, Yun, et al.
Korean Office action dated Jun. 11, 2014 for co-pending KR 10-2013-0073308, Yun, et al.

* cited by examiner

*Primary Examiner* — Brian Ngo
(74) *Attorney, Agent, or Firm* — Lee & Morse, P.C.

(57) ABSTRACT

A battery system includes a master rack that has a first battery pack and a master battery management system, which master battery management system controls the first battery pack, and includes a slave rack that has a second battery pack and a slave battery management system, which the slave battery management system controls the second battery pack in response to a command from the master battery management system. The slave battery management system reports information as to a state of the second battery pack, and the master battery management system controls the first battery pack after the master battery management system receives the information from the slave battery management system.

19 Claims, 9 Drawing Sheets

BATTERY SYSTEM AND ENERGY STORAGE SYSTEM

CROSS-REFERENCE TO RELATED APPLICATION

The present application claims priority under 35 U.S.C. §119 to U.S. Provisional Application No. 61/701,134, filed on Sep. 14, 2012, and entitled: "Battery System and Energy Storage System," which is incorporated herein by reference in its entirety.

BACKGROUND

As environmental contamination and resource exhaustion concerns have increased, interest in systems for storing energy and efficiently using the stored energy has also increased. There is also increased interest in renewable energy that does not cause pollution during power generation. Thus, research into energy storage systems, which may be used with renewable energy, a power storage battery system, and existing grid power is being actively conducted.

SUMMARY

Embodiments are directed a battery system having a master rack that includes a first battery pack and a master battery management system, in which the master battery management system controls the first battery pack, and a slave rack that includes a second battery pack and a slave battery management system, in which the slave battery management system controls the second battery pack in response to a command from the master battery management system, and the slave battery management system reports information as to a state of the second battery pack. The master battery management system controls the first battery pack after the master battery management system receives the information from the slave battery management system.

The slave battery management system may set the state of the second battery pack as one of an on state and an off state, based on the command. The master battery management system may receive the information as to the state of the second battery pack and may set a state of the first battery pack as one of an on state and an off state. The state of the first battery pack may be set to the on state after the state of the second battery pack is set to the on state.

The slave battery management system may be configured to attempt to set the state of the second battery pack as an on state based on the command from the master battery management system. A state of the first battery pack may be set to an on state when the reporting information from the slave battery management system indicates the attempt to set the state of the second battery pack as the on state was successful.

The master rack and the slave rack may include a master protective circuit and a slave protective circuit, respectively. The master protective circuit may include a first switch and the slave protective circuit may include a second switch. The slave battery management system may set a state of the second switch as one of an open state or a closed state, based on the command.

The master battery management system may be configured to transmit to an integrated controller information of a failure of the slave rack. The master battery management system may correspond to an overhead management system that controls both the first battery pack and the second battery pack.

The master rack may be in communication with both the first battery pack and the slave rack via a first bus. The slave rack may be in communication with the second battery pack via a second bus that is separate from the first bus. The master battery management system may provide the command to the slave battery management based on another command from an externally connected integrated controller. The master battery management system may be in communication with the externally connected integrated controller via a third bus that is separate from the first bus and the second bus. The slave rack may be one of a plurality of slave racks, and each of the plurality of slave racks may be connected to the master rack via the first bus.

The slave rack may include a protective circuit therein, and the slave battery management system may determine the state of the second battery pack based on a state of a switch in the protective circuit. The slave rack may include a protective circuit therein, and the protective circuit may include at least one switch that provides intermediate information as to the state of the second battery pack to the slave battery management system. The slave rack may include a plurality of slave battery trays, the slave battery trays being connected to the protective circuit. The slave battery management system may be configured to detect an abnormal condition in the second battery pack, and the slave battery management system may be configured to cut off a power supply to the second battery pack via the protective circuit when the abnormal condition is detected.

The slave rack may be one of a plurality of slave racks, and the master rack may be configured to transmit to an externally connected integrated controller information of a failure of any one of the plurality of slave racks. The slave rack may be one of a plurality of slave racks, and the plurality of slave racks may include a plurality of slave battery management systems and a plurality of second battery packs. The plurality of slave battery management systems may signal the setting of the states of the plurality of second battery packs, respectively, as an on state based on the command from the master battery management system. A state of the first battery pack may be set to an on state when each of the plurality of slave battery management systems indicates the setting of the states of the plurality of second battery packs was successful.

Embodiments are also directed to an energy storage system that includes the battery system and a power conversion system that includes an integrated controller. The integrated controller may be connected to the battery system, an external power generation system, an external grid, and an external load. In the battery system, the master battery management system may provide the command to the slave battery management based on another command from the integrated controller.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
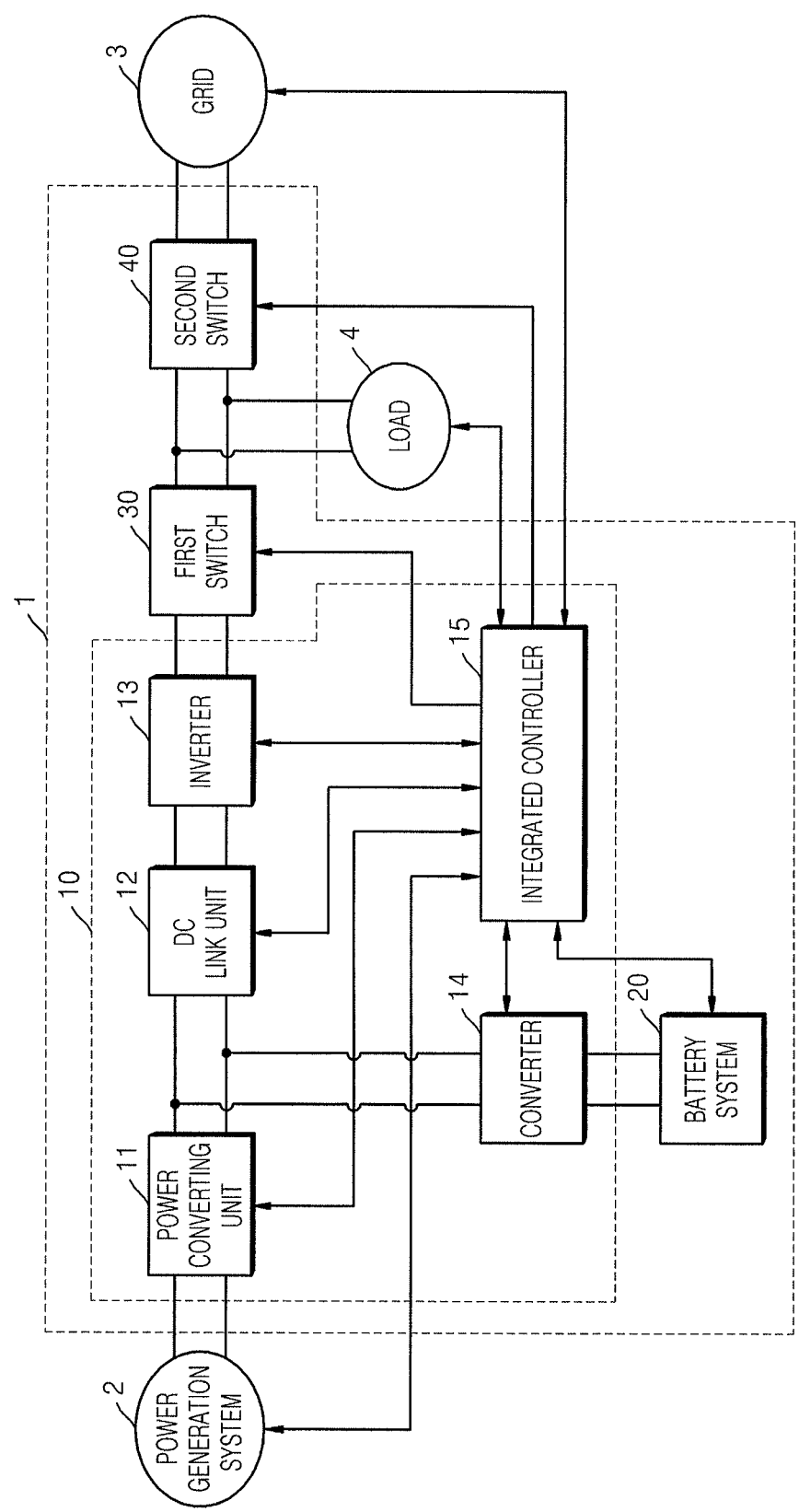
FIG. 1 illustrates a block diagram of an energy storage system according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another.

Embodiments will now be described more fully with reference to the accompanying drawings, in which exemplary embodiments are shown. Like reference numerals refer to like elements throughout. In the drawings, the same or corresponding elements are denoted by the same reference numerals, and a repeated explanation thereof will not be given.

FIG. 1 illustrates a block diagram of an energy storage system 1 according to an exemplary embodiment.

Referring to FIG. 1, the energy storage system 1 may be used with an external power generation system 2 and a grid 3 to supply power to an externally connected load 4.

The power generation system 2 may be a system that generates power by using an energy source. The power generation system 2 may generate power and supply the power to the energy storage system 1. The power generation system 2 may include at least one selected from the group of a solar power generation system, a wind power generation system, and a tidal power generation system. However, the solar power generation system, the wind power generation system, and the tidal power generation system are exemplary and the power generation system 2 is not limited thereto.

For example, the power generation system 2 may include any power generation system that may generate power by using renewable energy such as solar heat or geothermal heat. According to an exemplary embodiment, a solar cell for generating electrical energy by using sunlight may be applied to the energy storage system 1, which may be distributed in houses and factories. The power generation system 2 may act as a high-capacity energy system by arranging a plurality of power generation modules for generating power in parallel.

The grid 3 includes, e.g., a power plant, a substation, power lines, etc. If the grid 3 is in a normal state, the grid 3 may supply power to the energy storage system 1. For example, the grid 3 may supply power to at least one selected from the group of the load 4 and a battery system 20, or may receive power from the energy storage system 1 (e.g., particularly, may receive power from the battery system 20). If the grid 3 is in an abnormal state, power supply between the grid 3 and the energy storage system 1 may be stopped.

The load 4 may consume power generated by the power generation system 2, power stored in the battery system 20, or power supplied from the grid 3. Electric devices used in houses or factories may be an example of what constitutes the load 4.

The energy storage system 1 may store power generated by the power generation system 2 in the battery system 20, or supply the generated power to the grid 3. The energy storage system 1 may supply power stored in the battery system 20 to the grid 3, or may store power supplied from the grid 3 in the battery system 20. Also, the energy storage system 1 may supply power generated by the power generation system 2 or power stored in the battery system 20 to the grid 4. When the grid 3 is in an abnormal state, e.g., when there is a power failure in the grid 3, the energy storage system 1 may supply power generated by the power generation system 2 or power stored in the battery system 20 to the load 4 by performing an uninterruptible power supply (UPS) operation.

The energy storage system 1 may include a power conversion system (PCS) 10 that converts power, the battery system 20, a first switch 30, and a second switch 40.

The PCS 10 may convert power supplied from the power generation system 2, the grid 3, and the battery system 20 into an appropriate type of power and may supply the appropriate type of power to a desired location. The PCS 10 may include, e.g., a power converting unit 11, a direct current (DC) link unit 12, an inverter 13, a converter 14, and an integrated controller 15.

The power converting unit 11 may be connected between the power generation system 2 and the DC link unit 12. The power converting unit 11 may convert power generated by the power generation system 2 into a DC link voltage and may apply the DC link voltage to the DC link unit 12.

The power converting unit 11 may include a power conversion circuit, such as a converter circuit or a rectifier circuit, according to a type of the power generation system 2. For example, when the power generation system 2 generates DC power, the power converting unit 11 may include a DC-DC converter circuit for converting DC power generated by the power generation system 2 into other DC power. When the power generation system 2 generates alternating current (AC) power, the power converting unit 11 may include a rectifier circuit for converting the AC power into DC power.

According to an exemplary embodiment, when the power generation system 2 is a solar power generation system, the power converting unit 11 may include a maximum power point tracking (MPPT) converter that performs a MPPT control, so as to obtain maximum power output from the power generation system 2 according to a change in solar radiation, temperature, etc. When the power generation system 2 generates no power, the power converting unit 11 may stop operating, thereby minimizing power consumed by a power converter such as a converter circuit or a rectifier circuit included in the power converting unit 11.

A level of the DC link voltage may become unstable due to an instantaneous voltage drop in the power generation system 2 or the grid 3, or due to a peak load in the load 4. However, the DC link voltage should be stabilized to normally operate the inverter 13 and the converter 14. The DC link unit 20 may be connected between the power converting unit 11 and the inverter 13, and may maintain the DC link voltage constantly or substantially constantly. The DC link unit 12 may include, e.g., a mass storage capacitor.

The inverter 13 may be a power converter connected between the DC link unit 12 and the first switch 30. The inverter 13 may include an inverter that converts the DC link voltage output from at least one selected from the group of the power generation system 2 and the battery system 20 into an AC voltage of the grid 3, and that outputs the AC voltage. The inverter 13 may include a rectifier circuit that rectifies an AC voltage output from the grid 3 into the DC link voltage, e.g., to be stored in the battery system 20 in a charging mode. The inverter 13 may be a bidirectional inverter in which input and output directions may be changed.

The inverter 13 may include a filter for removing harmonics from the AC voltage output from the grid 3. The inventor 13 may include a phase-locked loop (PLL) circuit for matching a phase of the AC voltage output from the inverter 13 to a phase of the AC voltage of the grid 3 in order to reduce the possibility of and/or prevent the generation of reactive power. The inverter 13 may perform other functions such as restriction of a voltage variation range, power factor correction, removal of DC components, and/or protection from or reduction of transient phenomena.

The converter 14 may be a power converter connected between the DC link unit 12 and the battery system 20. The converter 14 may include a DC-DC converter that converts DC power stored in the battery system 20 into a DC link voltage of an appropriate level and that outputs the DC link voltage to the inverter 13 via the DC link unit 12 in a discharging mode. The converter 14 may include a DC-DC converter that converts DC power output from the power converting unit 11 or the inverter 13 into DC power of an appropriate voltage level, e.g., a charge voltage level desired by the battery system 20, and supplies the DC power to the battery system 20 in a charging mode. The converter 14 may be a bidirectional converter in which input and output directions may be changed. When the battery system 20 is not charged or discharged, the operation of the converter 14 may be stopped, thereby minimizing or reducing power consumption.

The integrated controller 15 may monitor states of the power generation system 2, the grid 3, the battery system 20, and/or the load 4. For example, the integrated controller 15 may monitor whether a power failure occurs in the grid 3, whether the power generation system 2 generates power, the amount of power generated by the power generation system 2, a charge state of the battery system 20, the amount of power consumed by the load 4, time, etc.

The integrated controller 15 may control operations of the power converting unit 11, the inverter 13, the converter 14, the battery system 20, the first switch 30, and the second switch 40 according to a preset algorithm or results of the monitoring. For example, when a power failure occurs in the grid 3, the integrated controller 15 may control power stored in the battery system 20 or power generated by the power generation system 2 to be supplied to the grid 4. When a sufficient amount of power is not be supplied to the load 4, the integrated controller 15 may control the load 4 to determine priorities for devices that use power included in the load 4 and supply power to those devices having higher priority. The integrated controller 15 may control the battery system 20 to be charged and discharged.

The first switch 30 and the second switch 40 may be connected in series between the inverter 13 and the grid 3, and control the flow of current between the power generation system 2 and the grid 3 by being turned on or off under the control of the integrated controller 15. The first switch 30 and the second switch 40 may be turned on or off according to states of the power generation system 2, the grid 3, and the battery system 20.

For example, when power of at least one selected from the group of the power generation system 2 and the battery system 20 is supplied to the load 4, or power of the grid 3 is supplied to the battery system 20, the first switch 30 may be turned on. When power of at least one selected from the group of the power generation system 2 and the battery system 20 is supplied to the grid 3, or power of the grid 3 is supplied to at least one selected from the group of the load 4 and the battery system 20, the second switch 40 may be turned on.

When a power failure occurs in the grid 3, the second switch 40 may be turned off and the first switch 30 may be turned on. That is, power from at least one selected from the group of the power generation system 2 and the battery system 20 is supplied to the load 4, and power supplied to the load 4 may be blocked and/or prevented from flowing toward the grid 3. As such, since the energy storage system 1 operates solely, a worker who works at a power distribution line of the grid 3 or the like may be protected from getting an electric shock due to a power output from the energy storage system 1.

Each of the first switch 30 and the second switch 40 may include a switching device such as a relay that may endure or process a large amount of current.

The battery system 20 may receive and store power supplied from at least one selected from the group of the power generation system 2 and the grid 3, and may supply stored power to at least one selected from the group of the load 4 and the grid 3. The battery system 20 may include a portion for storing power, and a portion for controlling and protecting the portion for storing power. The battery system 20 may be charged and discharged under the control of the integrated controller 15. The battery system 20 will now be described in detail with reference to FIG. 2.

Figure 2:
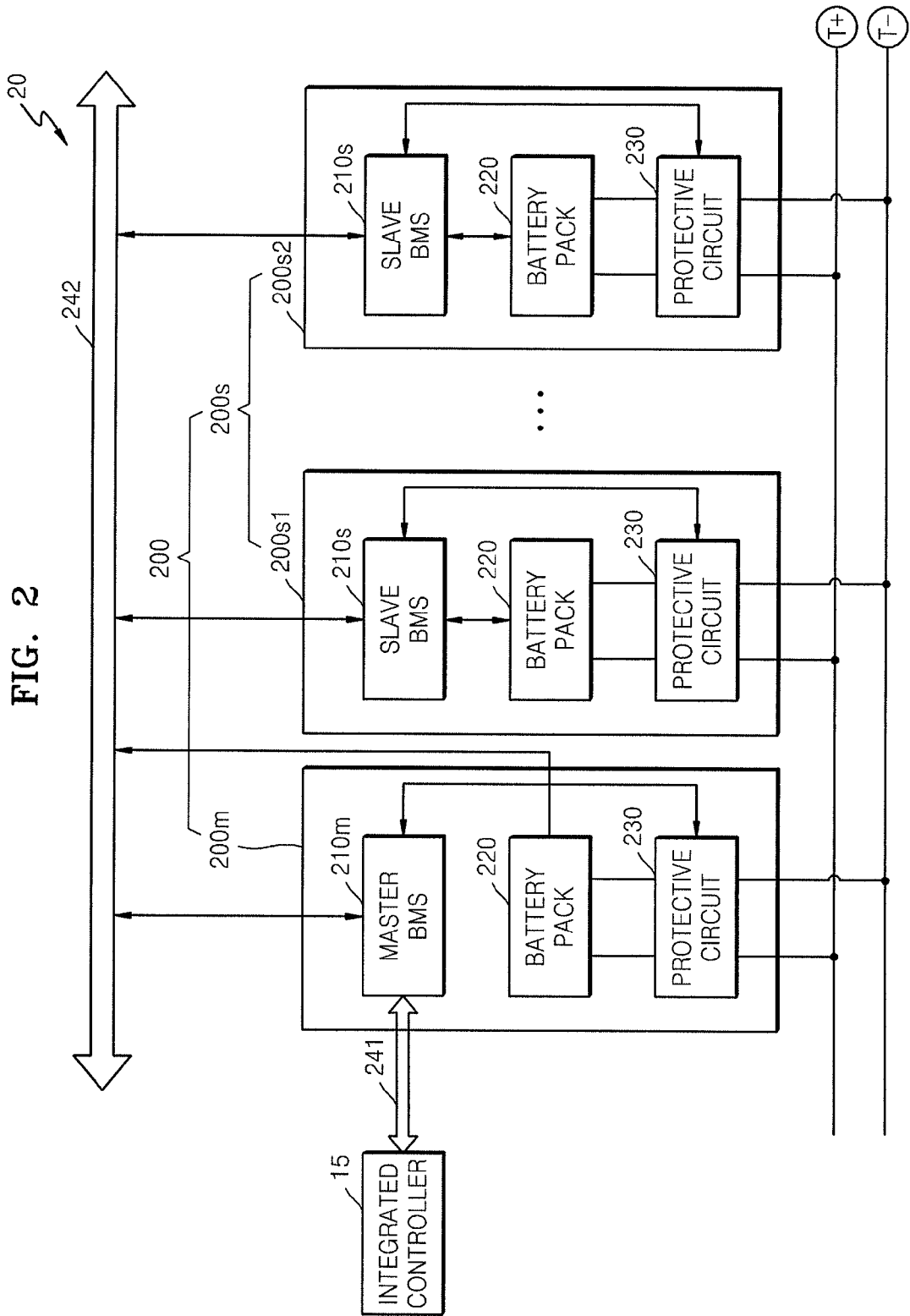
FIG. 2 illustrates a block diagram of a battery system according to an exemplary embodiment.

FIG. 2 illustrates a block diagram of the battery system 20 according to an exemplary embodiment.

Referring to FIG. 2, the battery system 20 may include a plurality of racks 200. For example, the plurality of racks 200 may include a master rack 200$m$ and a plurality of slave racks 200$s$ that include slave racks 200$s$1 and 200$s$2. The battery system 20 may further include a first bus 241 for data communication between the integrated controller 15 and the master rack 200$m$, and a second bus 242 for data communication among the plurality of racks. For example, the master rack 200$m$ and the slave racks 200$s$1 and 200$s$2 may communicate with each other through the second bus 242.

The plurality of racks 200$m$, 200$s$1, and 200$s$2 may store power supplied from the outside, e.g., from the power generation system 2 and/or the grid 3, and may supply the stored power to the grid 3 and/or the load 4. The master rack 200$m$ may include a master battery management system (BMS) 210$m$, a battery rack 220, and a protective circuit 230. Each of the slave racks 200$s$1 and 200$s$2 may include a slave BMS 210$s$, a battery rack 220, and a protective circuit 230.

Although the master rack 200$m$, and the slave racks 200$s$1 and 200$s$2 are denoted by different reference numerals in FIG. 2, when common operations, structures, and functions of the master rack 200$m$ and the slave racks 200$s$1 and 200$s$2 are explained, the master rack 200$m$ and the slave racks 200$s$1 and 200$s$2 may be collectively referred to as the rack 200 or the racks 200. Even when common operations, structures, and functions of the master BMS 210$m$ and the slave BMS 210$s$ are explained, the master BMS 210$m$ and the slave BMS 210$s$ may be collectively referred to as the BMS 210 or the BMSs 210.

The BMS 210 may control an overall operation of the rack 200. The BMS 210 may protect the rack 200 by controlling the protective circuit 230, e.g., the BMS 210 may protect the rack 200 from an abnormal condition. For example, when the abnormality of overcurrent flows or over-discharge occurs, the BMS 210 may cut off the power supply between the battery rack 220 and input/output terminals T+ and T− by opening a switch of the protective circuit 230. The BMS 210 may monitor a state of the battery rack 220, e.g., a temperature, a voltage, or current, and may measure data. The BMS 210 may control cell balancing of battery cells included in the battery rack 220 according to a preset algorithm or the measured data.

The battery rack 220 may store power supplied from the power generation system 2 and/or the grid 3, and may supply the stored power to the grid 3 and/or the load 4. The battery rack 220 may include one or more trays that are connected in series, in parallel, or in series-parallel. Although the battery racks 220 are illustrated as being connected in parallel in FIG. 2, the battery racks 220 may be connected in series or in series-parallel according to a request of the battery system 20.

The protective circuit 230 may close a switch to supply power or may cut off power supply under the control of the BMS 210. The protective circuit 230 may provide information about an output voltage and an output current of the battery rack 220, states of switches and of fuses, etc. to the BMS 210.

The first bus 241 is a path through which data or a command is transmitted between the integrated controller 15 and the master BMS 210m. The first bus 241 may be, e.g., a controller area network (CAN) bus. For example, the integrated controller 15 may transmit a command to the master BMS 210m via the first bus 241, and the master BMS 210m may transmit information relating to a status of the racks 200. In the case that one of the slave BMS 210s indicates a failure in a corresponding slave rack 200s, the master BMS 210m may transmit the notice of failure and/or information of the failure to the integrated controller 15. However, the embodiments are not limited thereto, e.g., the first bus 241 may be any appropriate communications protocol for transmitting data or a command via a bus.

The second bus 242 is a path through which data or a command is transmitted among the master BMS 210m and the slave BMSs 210s. The second bus 242 may be a CAN bus. However, the embodiments are not limited thereto, e.g., the second bus 242 may be any appropriate communications protocol for transmitting data or a command via a bus.

Each of the master BMS 210m and the slave BMSs 210s may collect data from the battery rack 220 and the protective circuit 230. For example, at least one selected from the group of an output current, an output voltage, a switch state, a fuse state, etc., may be included in the data collected from the protective circuit 230. A battery cell voltage, a temperature, etc. may be included in the data collected from the battery rack 220.

Each of the master BMS 210m and the slave BMSs 210s may calculate a remaining amount of power, a lifetime, a state of charge (SOC), etc. from the collected data, and/or may determine whether or not the abnormality occurs in each of the corresponding battery racks 220. For example, each of the master BMS 210m and the slave BMSs 210 may determine whether the abnormality (such as at least one selected from the group of overcharge, over-discharge, overcurrent, overvoltage, overheat, battery cell imbalancing, battery cell deterioration, etc.) occur in the corresponding battery racks 220. When the abnormality occurs, e.g., an abnormal condition is detected, each of the master BMS 210m and the slave BMSs 210s that have determined the abnormality may perform a predetermined operation according to an internal algorithm. For example, each of the master BMS 210m and the slave BMSs 210s may operate the corresponding protective circuit 230.

Each of the slave BMSs 210s may provide the data collected from the battery rack 220 and the protective circuit 230 to the master BMS 210m via the second bus 242. Each of the slave BMSs 210s may also provide information about whether an abnormality occurs or information about a type of abnormality to the master BMS 210m. For example, the master BMS 210m may control an operation of each of the slave racks 200s1 and 200s2. For example, the master BMS 210m may provide a control command to each of the slave BMSs 210s to operate the protective circuit 230.

The master BMS 210m may transmit the data collected from its own battery rack 220, e.g., a master battery rack, and protective circuit 230, and the data of the slave racks 200s1 and 200s2 transmitted from the slave BMSs 210s, to the integrated controller 15 via the first bus 241. The master BMS 210m may also provide the information about whether an abnormality occurs in the racks 200m, 200s1, and 200s2, or a type of abnormality, to the integrated circuit 15.

The integrated controller 15 may provide information about a state of the PCS 10, e.g., a state of the converter 14, to the master BMS 210m. For example, the integrated controller 15 may provide information about whether the converter 14 and the input/output terminals T+ and T− are opened, and/or information about current flowing through the converter 14, to the master BMS 210m. The master BMS 210m may control an operation of the battery system 20 based on the information received from the integrated controller 15.

For example, the master BMS 210m may transmit a control command to the slave BMSs 210s to turn on the slave racks 200s, e.g., the slave racks 200s1 and 200s2, respectively, according to the state of the PCS 10, and may turn on the master rack 200m. In particular, the slave BMSs 210s may control the slave racks 200s1 and 200s2, respectively, in response to a command from the master BMS 210m. Thereafter, the slave BMSs 210s may report information as to a state of the slave racks 200s, e.g., the slave racks 200s1 and 200s2, which information is used to turn on the master rack 200m. For example, when each of the slave BMSs 210 report an operational state of a corresponding one of the slave racks 200s being turned on, the master BMS 210m may turn on the master rack 200m. Accordingly, the master BMS 210m may control the master rack 200m after the master BMS 210m receives the information from the slave BMSs 210s, e.g., after the master BMS 210m receives information about an operational state of each of the slave racks 200s1 and 200s2.

The integrated controller 15 may control the battery system 20 to be turned on or off. For example, the integrated controller 15 may transmit an on/off control command of the battery system 20 to the master BMS 210m. Then, the master BMS 210m may transmit a control command to the slave BMSs 210s to turn on the slave racks 200s1 and 200s2 according to a control command of the integrated controller 15, and may turn on the master rack 200m.

The integrated controller 15 may provide management data to the master BMS 210m and the slave BMSs 210s. The management data may include information about the battery cells of each of the master BMS 210m and the slave BMSs 210s, e.g., the information may include firmware, an internal algorithm, an internal management standard, etc.

The master BMS 210m may transmit a command for controlling the slave racks 200s1 and 200s2 to the slave BMSs 210s according to a control command output from the integrated controller 15 and/or an internal algorithm. For example, the master BMS 210m may transmit a command to the slave BMSs 210s for controlling the operation state of the slave racks 200s1 and 200s2, i.e., to turned on or off the slave racks 200s1 and 200s2. The master BMS 210m may also command the slave BMSs 210s to transmit data about states of the battery racks 220.

When the battery racks 220 are connected in series, cell balancing of all battery cells of the battery racks 220 needs to be achieved. For example, the master BMS 210m may collect cell voltage data about all of the battery cells and may control cell balancing of the battery cells of the slave racks 200s1 and 200s2 by using the slave BMSs 210s.

The master BMS 210m and the slave BMSs 210s may constitute a master-slave system as shown in FIG. 2. The master BMS 210m may control not only the master rack 200m but also the slave racks 200s1 and 200s2 by using the slave BMSs 210s. Accordingly, a system BMS for controlling the master BMS 210m and the slave BMSs 210s between the master BMS 210 and slave BMSs 210s and the integrated controller 15 may be omitted. For example, an overhead battery management system for controlling each of the BMSs 210, i.e., each of the master BMS 210m and the slave BMSs 210s, may be excluded because the master BMS 210m may perform the function of both controlling a corresponding battery rack 220 within the master rack 200m and each of the slave BMSs 210s. In other words, the master BMS 210m may be directly connected to the integrated controller 15 without an additional battery management system therebetween.

Also, since the integrated controller 15 may communicate with only the master BMS 210m, even when the number of the slave racks 200s is increased, the integrated controller 15 does not need to communicate with the additional slave racks 200s. Accordingly, even when the additional slave racks 200s are added, settings of the integrated controller 15 may remain unchanged.

Figure 3:
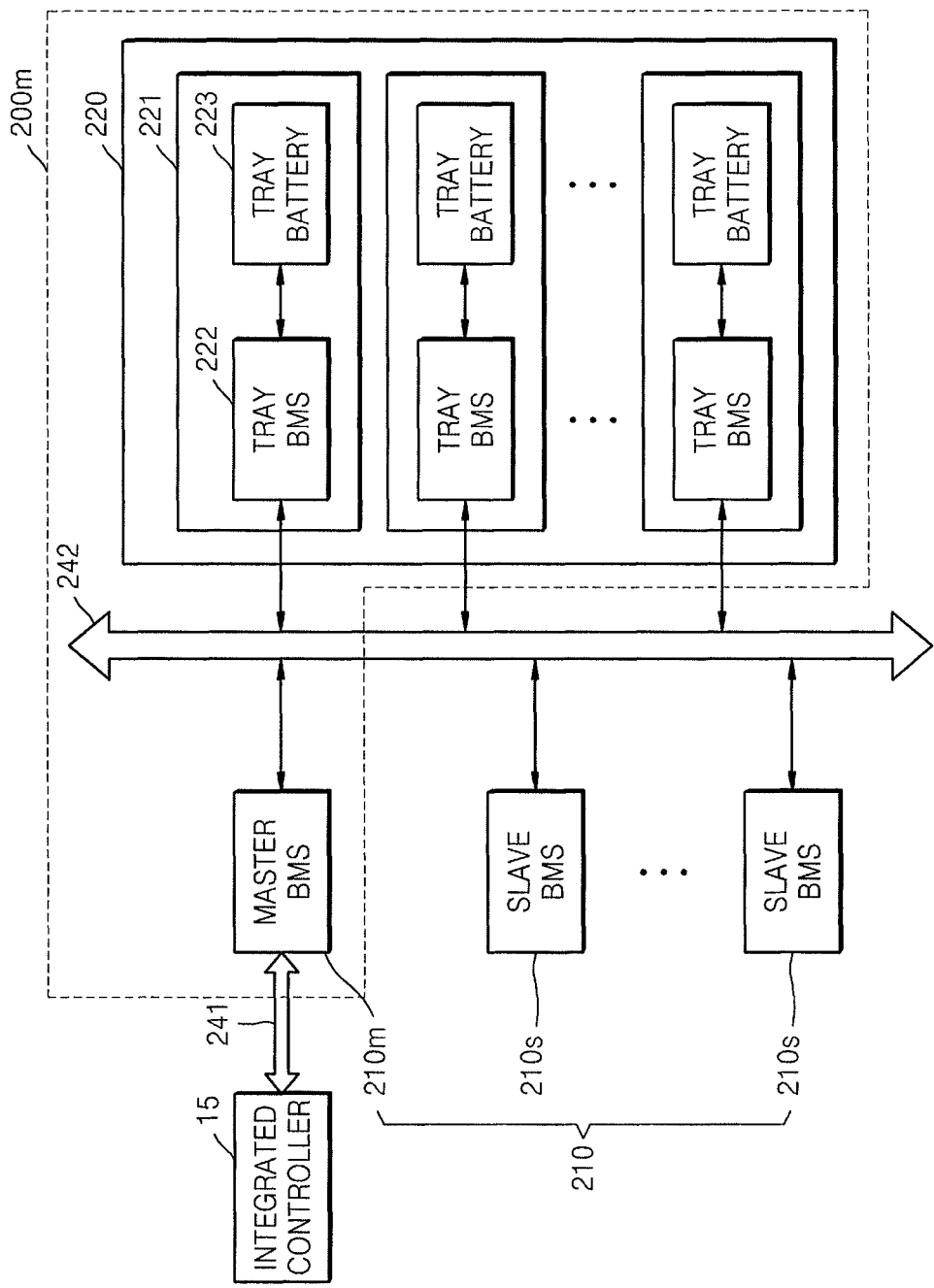
FIG. 3 illustrates a block diagram of a master rack according to an exemplary embodiment.

FIG. 3 illustrates a block diagram of the master rack 200m according to an exemplary embodiment.

Referring to FIG. 3, the master rack 200m may include the master BMS 210m, the battery rack 220 including a plurality of trays 221, and the second bus 242 for data communication between the master BMS 210m and the plurality of trays 221. Further, the master rack 200m may include the protective circuit 230 as shown in FIG. 2, which is not shown in FIG. 3.

Figure 4:
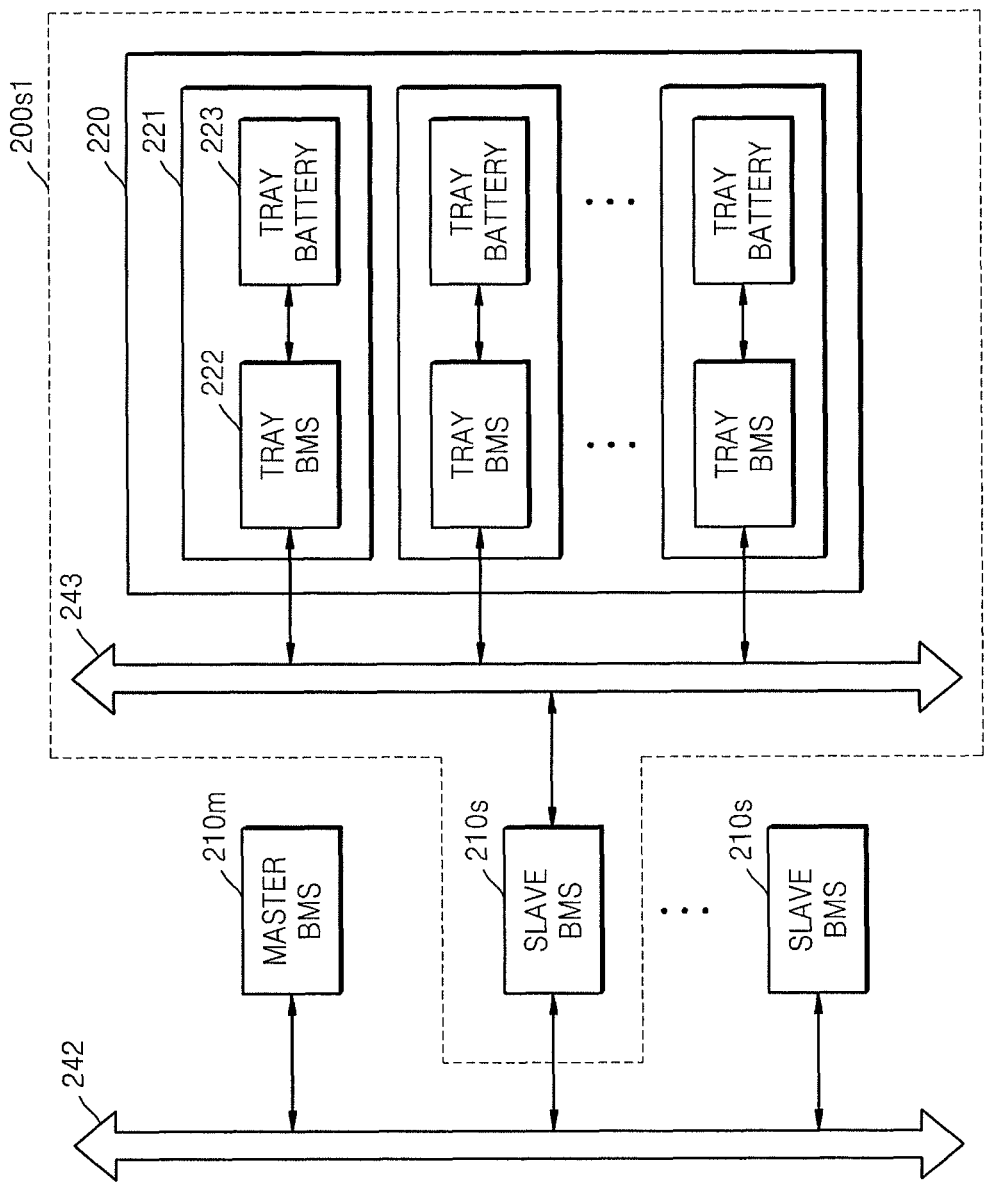
FIG. 4 illustrates a block diagram of a slave rack according to an exemplary embodiment.

The trays 221, which are subordinate elements of the battery rack 220, may store power output from the grid 3 and/or the power generation system 2, and supply the stored power to the grid 3 and/or the load 4. Each of the trays 221 may include a tray BMS 222 and a tray battery 223. FIG. 3 illustrates that the master rack 200m includes the trays 221 for ease of explanation, but embodiments are not limited thereto. For example, as illustrated in FIG. 4, at least one of the slave racks 200s may similarly include trays 221, and the configuration and arrangement of the trays 221 may be the same as illustrated with respect to the master rack 200m.

Each of the trays 221 may include at least one tray BMS 222 and may include at least one tray battery 223 connected to that tray BMS 222. For example, each of the trays 221 may include one tray BMS 222 connected to one tray battery 223.

The tray battery 223 that stores power may include a plurality of battery cells that are connected in series, in parallel, or in series-parallel. The battery cells may include rechargeable secondary batteries. For example, the battery cells may include at least one selected from the group of nickel-cadmium batteries, lead storage batteries, nickel metal hydride (NiMH) batteries, lithium-ion batteries, and lithium polymer batteries. The number of battery cells included in the tray battery 223 may be determined according to a desired output voltage.

The tray BMS 222 may measure a state of the tray battery 223, e.g., at least one selected from the group of a temperature of a battery cell, a cell voltage, an output current, etc., and may transmit the measured data to the master BMS 210m via the second bus 242. Also, the tray BMS 222 may perform cell balancing of the tray battery 223 according to a cell balancing control command of the master BMS 210m.

The second bus 242 is a path through which data or a command is transmitted between the master BMS 210m and the tray BMSs 222 of the master rack 200m. Also, data or a command may also be transmitted via the second bus 242 between the master BMS 210m and the slave BMSs 210s. The second bus 242 may be a CAN bus as described above.

The master BMS 210m may communicate with the integrated controller 15 via the first bus 241. Further, the master BMS 210m may communicate with each of the slave BMSs 210s and each of the tray BMSs 222 of the master rack 200m via the second bus 242. For example, the master BMS 210m may communicate with not only the slave BMSs 210s but also the tray BMSs 222 of the master rack 200m via the same second bus 242. Thus, the master BMS 210m may communicate directly with each of the tray BMSs 222 in the master rack 200m and each of the slave BMSs 210s, e.g., without an additional bus or battery management system therebetween.

The integrated controller 15, e.g., may transmit a frame signal including a command to the first bus 241. The master BMS 210m may receive the frame signal, and may perform an operation corresponding to a command included in the frame signal. For example, the master BMS 210m may provide a command to the trays 221 within the master rack 200m and/or the slave BMSs 210s. Also, the master BMS 210m may transmit a frame signal including data to the first bus 241. The integrated controller 15 may receive the frame signal from the master BMS 210m, and may perform a desired operation.

When performing an operation corresponding to a command included in the frame signal from the integrated controller 15, the master BMS 210m may transmit a frame signal including a command to the second bus 242. The slave BMSs 210s may receive the frame signal, and may perform an operation corresponding to the command included in the frame signal. The slave BMSs 210s may transmit a frame signal including data to the second bus 242. The master BMS 210m may receive the frame signal, and may perform a desired operation.

The master BMS 210m may transmit a frame signal including a command to the second bus 242. The tray BMSs 222 of the master rack 200m may receive the frame signal, and may perform an operation corresponding to the command included in the frame signal. The tray BMSs 222 of the master rack 200m may transmit a frame signal including data to the second bus 242. The master BMS 210m may receive the frame signal, and may perform a desired operation.

FIG. 4 illustrates a block diagram of the slave rack 200s1, according to an exemplary embodiment. FIG. 4 illustrates the slave rack 200s1 for explanatory purposes, and the slave rack 200s2 may have the same configuration as the slave rack 200s1.

Referring to FIG. 4, the slave rack 200s1 may include the slave BMS 210s, the plurality of trays 221, and a third bus 243 for data communication between the slave BMS 210s and the plurality of trays 221. Although the slave rack 200s1 may include the protective circuit 230 as shown in FIG. 2, the protective circuit 230 is not shown in FIG. 4. The trays 221 have been explained with reference to FIG. 3, and thus a repeated explanation thereof will not be given.

As described above, the second bus 242 is a path through which data or a command is transmitted between the master BMS 210m and the tray BMSs 222 of the master rack 200m. The second bus 242 is also a path through which data or a command is transmitted between the slave BMSs 210s and the master BMS 210m.

The third bus 243 is a path through which data or a command is transmitted between the slave BMS 210 and the tray BMSs 222 of the slave rack 200s1. The third bus 243 may be a CAN bus. However, embodiments are not limited thereto, e.g., the third bus 243 may be any appropriate communications protocol for transmitting data or a command via a bus.

The slave BMS 210s may communicate with the master BMS 210m via the second bus 242, and may communicate with the tray BMSs 222 of the slave rack 200s1 via the third bus 243.

The slave BMS 210s may transmit a frame signal including a command to the third bus 243. The tray BMSs 222 of the slave rack 200s1 may receive the frame signal, and may perform an operation corresponding to the command included in the frame signal. Also, the tray BMSs 222 of the slave rack 200s1 may transmit a frame signal including data to the third bus 243. The slave BMS 210s may receive the frame signal, and may perform a necessary operation.

Figure 5:
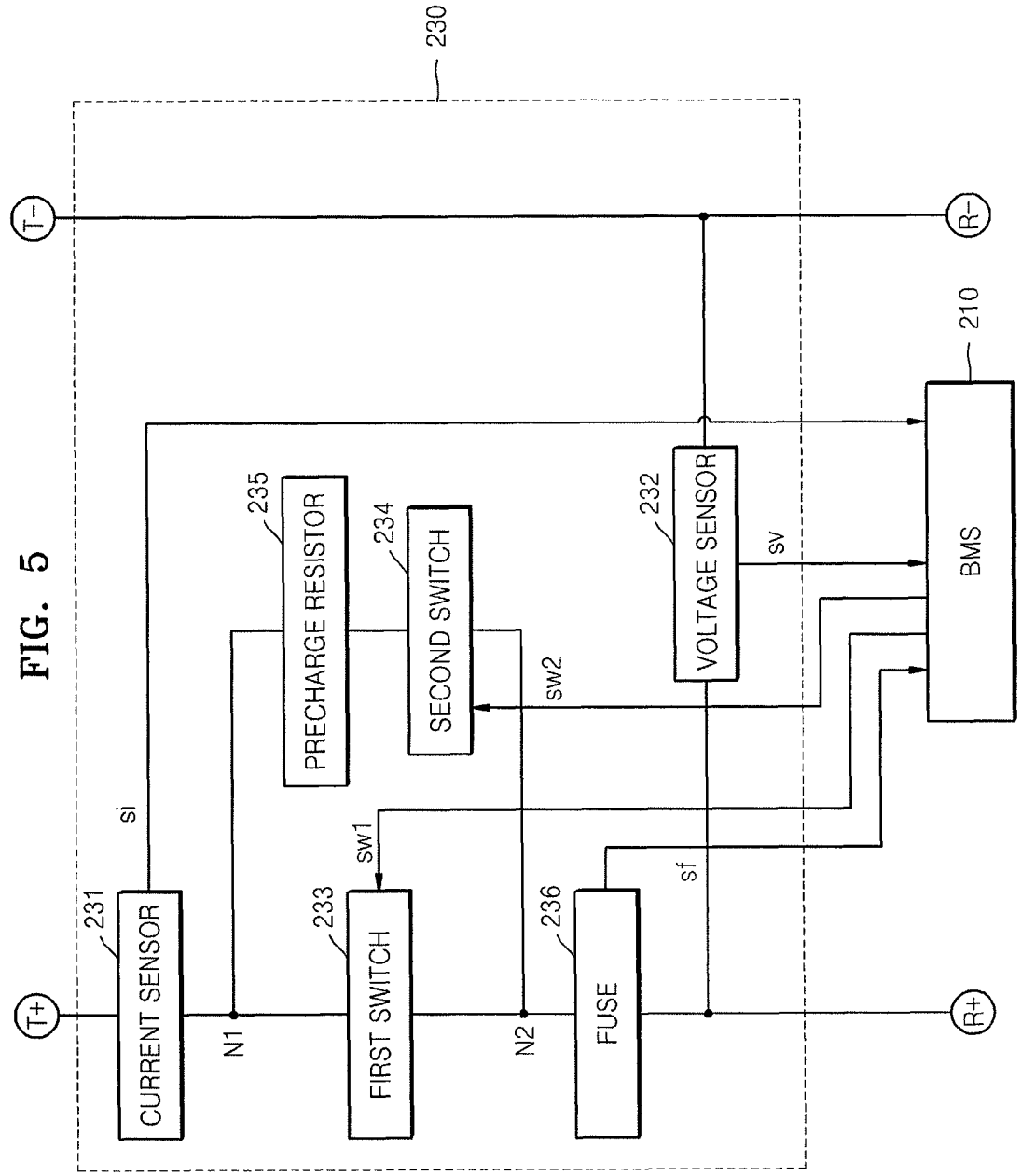
FIG. 5 illustrates a diagram of a protective circuit according to an exemplary embodiment.

FIG. 5 illustrates a block diagram of the protective circuit 230 according to an exemplary embodiment.

Referring to FIG. 5, the protective circuit 230 may include, e.g., a current sensor 231, a voltage sensor 232, a first switch 233, a second switch 234, a precharge resistor 235, and a fuse 236.

The current sensor 231 measures an output current of the battery rack 220. The current sensor 231 may apply a signal si corresponding to the output current to the BMS 210, e.g., the BMS 210 may correspond to the master BMS 210m or one of the slave BMSs 210s. Although the current sensor 231 is illustrated as being disposed between a rack output terminal R+ and an input/output terminal T+ in FIG. 5, embodiments are not limited thereto. For example, the current sensor 231 may be disposed between a rack output terminal R− and an input/output terminal T−.

The voltage sensor 232 measures an output voltage of the battery rack 220, e.g., the battery rack 220 may be in the master rack 200m or one of the slave racks 200s. The voltage sensor 232 may apply a signal sv corresponding to the output voltage to the BMS 210. Although the voltage sensor 232 is illustrated as being disposed between the rack output terminals R+ and R− in FIG. 5, embodiments are not limited thereto. For example, the voltage sensor 232 may be disposed between the input/output terminals T+ and T−, if desired. According to another exemplary embodiment, the protective circuit 230 may further include a voltage sensor for measuring a voltage between the input/output terminals T+ and T−.

The first switch 233 is a switching element for closing or opening a first node N1 and a second node N2 between the rack output terminal R+ and the input/output terminal T+. To charge or discharge the battery rack 220, the first switch 233 should be closed. Once the first switch 233 is opened, power supply between the rack output terminal R+ and the input/output terminal T+ may be cut off. The first switch 233 receives a first switch control signal sw1 from the BMS 210, and may be opened or closed according to the first switch control signal sw1. The first switch 233 may provide information about an opening/closing state to the BMS 210. For example, the first switch 233 may provide intermediate information as to the state of the corresponding one of the plurality of racks 200 (e.g., information as to the state of the battery rack 220 within the corresponding one of the racks 200), which intermediate information is used by the BMS 210 to report information as to the state of the corresponding on the racks 200.

In the case that the first switch 233 is in the protective circuit 230 of the slave rack 200s1, e.g., the first switch 233 may provide intermediate information as to the state of the battery rack 220 in the slave rack 200s1 to the slave BMS 210s in the slave rack 200s1. Thereafter, the slave BMS 210s may report the information as to the state of the battery rack 220 to the master BMS 210m in the master rack 200m.

The second switch 234 and the precharge resistor 235 may be connected in series between the first node N1 and the second node N2. The second switch 234 receives a second switch control signal sw2, and is opened or closed according to the second switch control signal sw2. The second switch 234 may provide information about an opening/closing state to the BMS 210. For example, the second switch 234 may provide intermediate information as to the state of the corresponding one of the racks 200 having the battery rack 220.

In the case that the second switch 234 is in the protective circuit 230 of the slave rack 200s1, e.g., the second switch 234 may provide intermediate information as to the state of the battery rack 220 in the slave rack 200s1 to the slave BMS 210s in the slave rack 200s1. Thereafter, the slave BMS 210s may report the information as to the state of the battery rack 220 to the master BMS 210m in the master rack 200m.

Each of the first switch 233 and the second switch 234 may include a relay for cutting off an output current of the battery rack 220. For example, each of the first switch control signal sw1 and the second switch control signal sw2 may be a control signal with a predetermined direct current (DC) voltage. For example, when the first switch control signal sw1 and/or the second switch control signal sw2 has DC 12V, the first switch 233 and/or the second switch 234 may be closed. When the first switch control signal sw1 and/or the second switch control signal sw2 has 0V, the first switch 233 and/or the second switch 234 may be opened.

The precharge resistor 235 may limit an inrush current that may flow when the input/output terminals T+ and T− and the rack output terminals R+ and R− are connected to each other. A mass storage capacitor may be connected between the rack output terminals R+ and R− to stabilize an output voltage. However, when the first switch 233 is closed in a state where the mass storage capacitor is discharged, an inrush current may be generated in order to charge the mass storage capacitor. Such an overcurrent may impair, damage, and/or cause a breakage in the battery system 20.

The precharge resistor 235 may reduce the possibility of and/or prevent the inrush current from being generated by closing the second switch 234 before closing the first switch 233. When the second switch 234 is closed, and then the mass storage capacitor is charged, the first switch 233 may be closed and the second switch 234 may be opened.

The fuse 236 may be formed on a high current path between the rack output terminal R+ and the input/output terminal T+. When overcurrent flows through the high current path, the fuse 236 may permanently cut off the high current path. The fuse 236 may apply a signal sf indicating a state of the fuse 236 to the BMS 210.

The protective circuit 230 may be physically separated from the BMS 210. The BMS 210 may be configured to control the protective circuit 230 by using one or more signal lines. For example, the BMS 210 and the protective circuit 230 may be formed on different boards. Accordingly, the high current path passing through the protective circuit 230 may not pass through the BMS 210.

Figure 6:
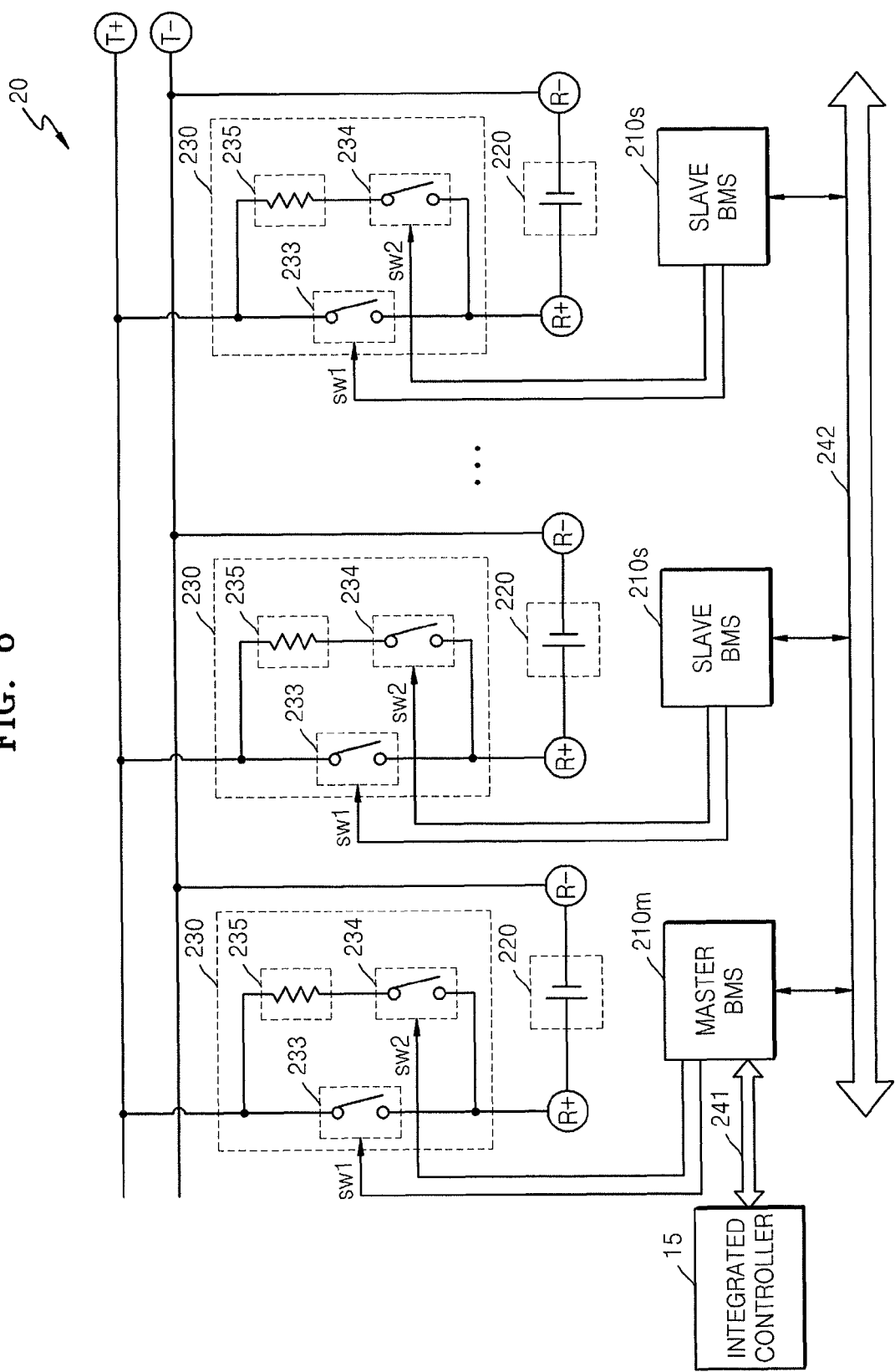
FIG. 6 illustrates a block diagram of a battery system including a plurality of protective circuits according to an exemplary embodiment.

FIG. 6 illustrates a block diagram of a battery system 20 according to another exemplary embodiment.

Referring to FIG. 6, the battery racks 220 are connected in parallel to the input/output terminals T+ and T− through the protective circuits 230.

Although each of the protective circuits 230 includes the first switch 233, the second switch 234, and the precharge resistor 235 in FIG. 6, embodiments are not limited thereto. For example, the protective circuit 230 may further include a current sensor, a voltage sensor, and a fuse as shown in FIG. 5.

The master BMS 210*m* may control the first switch 233 and the second switch 234 of the protective circuit 230, e.g., the protective circuit 230 in the master rack 200*m*, to be closed and opened. Likewise, each of the slave BMSs 210*s* may control the first switch 233 and the second switch 234 of the protective circuit 230, e.g., in a corresponding one of the slave racks 200*s*, to be closed and opened.

As described above, if the rack output terminals R+ and R− of the battery rack 220 are connected to the input/output terminals T+ and T−, when a predetermined period of time passes after the BMS 210 closes the second switch 234, the BMS 210 may close the first switch 233 and may open the second switch 234. If the rack output terminals R+ and R− of the battery rack 220 are separated from the input/output terminals T+ and T−, the BMS 210 may open the first switch 233.

The BMS 210 may control the first switch 233 and the second switch 234 to be closed and opened according to an internal algorithm. For example, when it is detected that abnormality occurs in the battery rack 220, the BMS 210 may open the first switch 233. Also, if the battery rack 220 returns to its normal state, when a predetermined period of time passes after the BMS 210 closes the second switch 234, the BMS 210 may close the first switch 233 and open the second switch 234.

The BMS 210 may control the first switch 233 and the second switch 234 to be closed and opened according to a control command of a superordinate element. For example, the slave BMS 210*s* may control the first switch 233 and the second switch 234 according to a control command of the master BMS 210*m*. Also, the master BMS 210*m* may control the first switch 233 and the second switch 234 according to a control command of the integrated controller 15. For example, the master BMS 210*m* may indirectly, i.e., via a slave BMS 210*a*, control states of the first switch 233 and the second switch 234 based on the control command of the integrated controller 15.

The master BMS 210*m* may provide a rack on control command to the slave BMS 210*s* to connect the rack output terminals R+ and R− to the input/output terminals T+ and T1. According to the rack on control command, the slave BMS 210*s* may close the second switch 234 in the protective circuit 230, and after a predetermined period of time passes, may close the first switch 233 and may open the second switch 234.

According to an exemplary embodiment, the master BMS 210*m* may sequentially provide a second switch on control command, a first switch on control command, and a second switch off control command to the slave BMS 210*s* in order to connect the rack output terminals R+ and R− corresponding to the slave BMS 210*s* to the input/output terminals T+ and T1.

The master BMS 210*m* may provide a control command to the slave BMS 210*s*, and then may determine whether an operation is normally performed according to the control command. The slave BMS 210*s* may perform the operation according to the control command received from the master BMS 210*m*, and then may transmit a result of the operation to the master BMS 210*m*. The master BMS 210*m* may receive the result of the operation from the slave BMS 210*s*, and then may perform another operation.

When the master BMS 210*m* provides a rack on command to the slave BMS 210*s*, the slave BMS 210*s* may generate a first switch control signal sw1 and then may apply a signal indicating that the rack on command is performed to the master BMS 210*m*.

According to another exemplary embodiment, the slave BMS 210*s* may generate a second switch control signal sw2, and then may apply a signal indicating that the rack on command is performed to the master BMS 210*m*. According to yet another exemplary embodiment, when the slave BMS 210*s* detects an opening/closing state of the first switch 233, the slave BMS 210*s* may detect the opening/closing state of the first switch 233, and then may apply a signal indicating that the rack on command is performed to the master BMS 210*m*.

According to still yet another exemplary embodiment, the slave BMS 210*s* may detect a rack output current, and then may apply a signal indicating the rack on command is performed to the master BMS 210*m*. According to still another exemplary embodiment, when the slave BMS 210*s* detects an output voltage between the input/output terminals T+ and T1, the slave BMS 210*s* may detect the output voltage between the input/output terminals T+ and T−, and then may apply a signal indicating that the rack on command is performed to the master BMS 210*m*.

As such, even in response to a rack off command, the slave BMS 210*s* may determine whether the rack 200 is turned off by using a first switch control signal sw1, a first switch state, a rack output current, and an output voltage between the input/output terminals T+ and T−.

The master BMS 210*m* may communicate with the integrated controller 15 via the first bus 241, and may receive information about a state of the PCS 10 from the integrated controller 15. When the PCS 10 is prepared, e.g., completely prepared, according to an internal algorithm, and it is determined that the battery system 20 may be connected to the PCS 10, the master BMS 210*m* may determine to turn on the battery system 20. When the battery system 20 returns from an abnormal state to its normal state, the master BMS 210*m* may determine to turn on the battery system 20. The master BMS 210*m* may provide a rack on control command to the slave BMS 210*s*.

The slave BMS 210*s* may close the second switch 234 according to a second switch control signal sw2. Next, the slave BMS 210*s* may close the first switch 233 according to a first switch control signal sw1. The slave BMS 210*s* may determine whether the first switch 233 is closed, and may apply a signal indicating that an operation is normally performed according to the rack on control command to the master BMS 210*m*. Also, the slave BMS 210*s* may open the second switch 234 according to a second switch control signal sw2.

The master BMS 210*m* may receive a signal indicating that the rack 200 is normally turned on from the slave BMS 210*s*, and then may provide a rack on control command to another slave BMS 210*s*. In such a manner, the master BMS 210*m* may detect that slave racks are normally turned on. Next, the master BMS 210*m* may finally turn on its own master rack 200*m*, e.g., turn on the battery rack 220 in the master rack 200*m*.

According to another exemplary embodiment, the master BMS 210*m* may simultaneously provide rack on control commands to each of the slave BMSs 210*s*. The slave BMSs 210*s* may turn on their own slave racks 200s, e.g., turn on the battery racks 220 in the corresponding slave racks 200s, according to the rack on control signals. Then, the slave BMSs 210s may transmit signals indicating that the slave racks 200s are turned on to the master BMS 210. The master BMS 210m may detect that all of the slave racks 200s are turned on, and then may turn on its own master rack 200m.

When a battery system is turned on, all of the racks should be simultaneously turned on. When turn on times for racks are different, imbalancing may occur between the racks. According to some of the embodiments, since the master BMS 210m first turns on the slave racks 200s by using the slave BMS 210s, and then finally turns on the master rack 200m, a difference between turn on times of the racks 200 may be minimized. For example, because it takes more time to turn on the slave racks 200s through communications than to turn on its own master rack 200m. Accordingly, in an exemplary embodiment, the operation of the slave racks 200s (e.g., the battery racks 220 in the slave racks 200s) is commenced before operation of the master rack 200m is commenced in an effort provide proper balancing within the battery system 20.

Also, since the master BMS 210m detects that the slave racks 200s are turned on and then turns on its own master rack 200m, the master BMS 210m may be further stably operated. For example, when the master rack 200m is only turned on in a state where the slave racks 200s have not failed to be turned on, imbalancing between the racks 200 may be avoided.

Abnormality may occur while the battery system 20 is operated. For example, overcharge or overdischarge may occur. Also, overheat or overcurrent may occur. Such abnormality may occur in the entire battery system 20, or may occur in a specific one of the racks 200. When an abnormality occurs only in a specific one of the racks 200, the BMS 210 of the specific one of the racks 200 may determine whether to turn on or off the specific one of the racks 200. In this case, the BMS 210 may open the first switch 233 of the protective circuit 230, When the master BMS 210 detects abnormality, and thus the entire battery system 20 should be turned off, the master BMS 210 may transmit a rack off control command to the slave BMS 210s. The slave BMS 210s may open the first switch 233 of the protective circuit 230 in response to the rack off control command. Next, the slave BMS 210s may inform the master BMS 210m that the first switch 233 is opened. The master BMS 210m may then transmit a rack off control command to another BMS 210s. In such a manner, the master BMS 210m may turn off all slave racks 200s, and then may turn off its own master rack 200m.

According to another exemplary embodiment, the master BMS 210 may simultaneously transmit rack off control commands to the slave BMSs 210s. Each of the slave BMSs 210s may open the first switch 233 of the protective circuit 230 in response to the rack off control command, and may inform the master BMS 210m that the first switch 233 is opened. The master BMS 210m may then detect that all slave racks 200s are turned off from the slave BMSs 210s, and then may turn off its own master rack 200m.

When a rack 200 is turned on, it means that the rack output terminals R+ and R− of the rack 200 are connected to the input/output terminals T+ and T−. For example, it means that the first switch 233 is closed. Also, when a rack 200 is turned off, it means that the rack output terminals R+ and R− of the rack 200 are separated from the input/output terminals T+ and T−. For example, it means that both the first switch 233 and the second switch 234 are opened. When the second switch 234 is closed and the first switch 233 is opened, it may be regarded as a precharge operation being performed.

Figure 7:
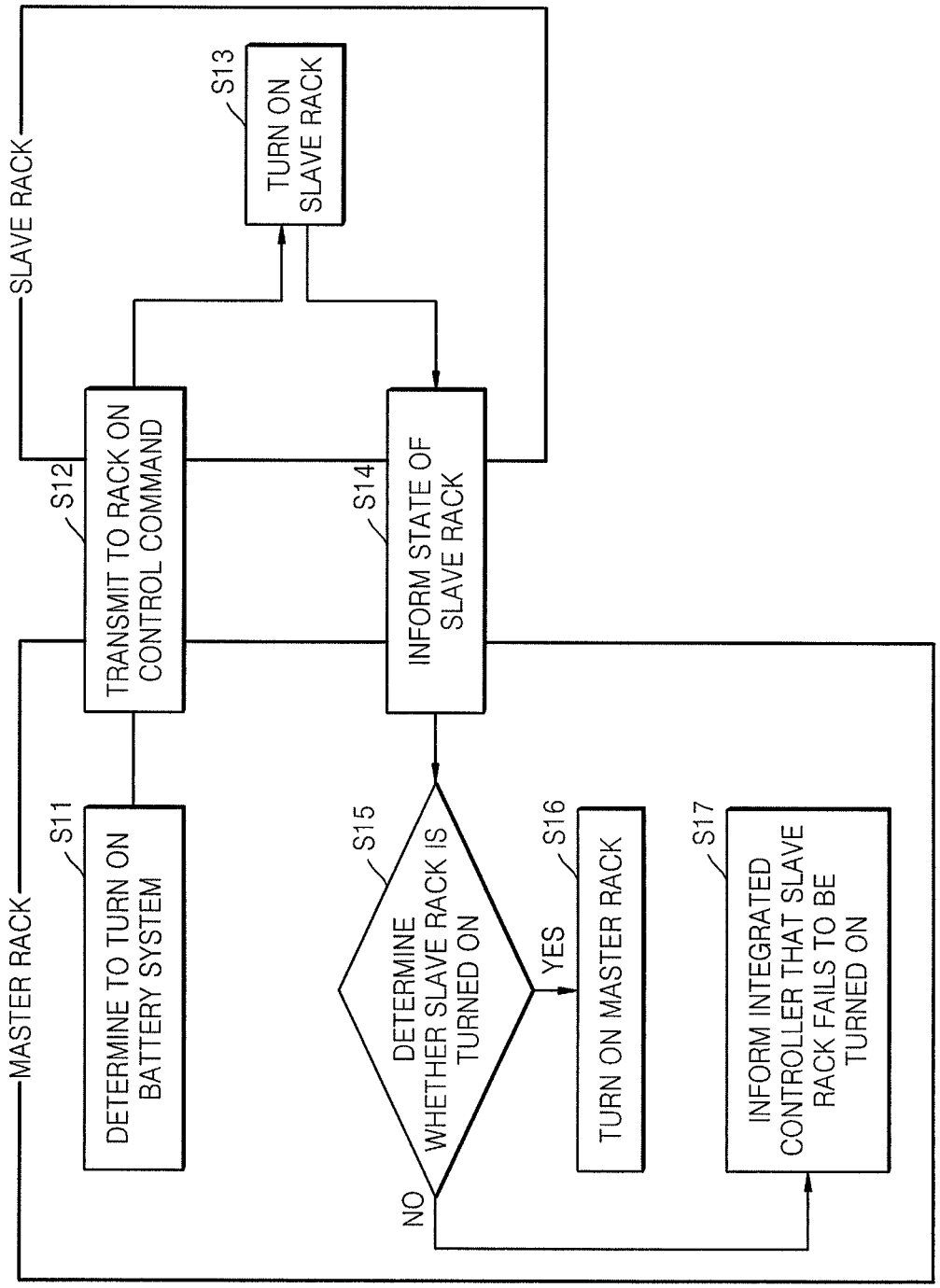
FIGS. 7, 8, and 9 illustrate operational flowcharts of a battery system, according to exemplary embodiments.

FIG. 7 illustrates a flowchart of a sequence of operations of the battery system 20, according to an exemplary embodiment.

Referring to FIGS. 6 and 7, operations of a master rack and a slave rack, and a command or data transmitted between the master rack and the slave rack, are illustrated. Although one slave rack is illustrated in FIG. 7, it will be understood by one of ordinary skill in the art that a plurality of the slave racks may exist without departing from the scope. The master rack may correspond to the master rack 200m discussed with reference to FIGS. 2-6. The slave rack may correspond to the slave racks 200s discussed with reference to FIGS. 2-6.

In operation S11, the master BMS, which may correspond to the master BMS 210m of the master rack 200m, may turn on the battery system 20 based on an determination. For example, when the master BMS 210m receives a battery system turn on control command from the integrated controller 15, the battery system 20 starts operating, or the battery system 20 returns from an abnormal state to its normal state, the master BMS 210m may determine to turn on the battery system 20.

In operation S12, the master BMS 210m may transmit a rack on control command for turning on the slave rack to the slave BMS, which may correspond to the slave BMS 210s of the slave rack 200s. In operation S13, the slave BMS 210s may turn on the slave rack 200s in response to the rack on control command from the master BMS 210m. As described above, the slave BMS 210s may close the second switch 234 of the slave rack 200s, and then may close the first switch 233. Next, the slave BMS 210s may open the second switch 234.

In operation S14, the slave BMS 210s may inform that the slave rack 200s has been turned on. The slave BMS 210s may transmit information about a state of the slave rack 200s to the master BMS 210m.

In operation S15, the master BMS 210m may determine whether the slave rack 200s has been turned on from the information about the state of the slave rack 200s transmitted from the slave BMS 210s.

When it is determined in operation S15 that the slave rack 200s has been turned on, the sequence of operations proceed to operation S16. In operation S16, the master BMS 210m may turn on the master rack 200m. However, when it is determined in operation S15 that the slave rack 200s has not been turned on, the sequence of operations proceed to operation S17. In operation S17, the master BMS 210m may transmit a message indicating that the slave rack 200s fails to be turned on to the integrated controller 15.

Figure 8:
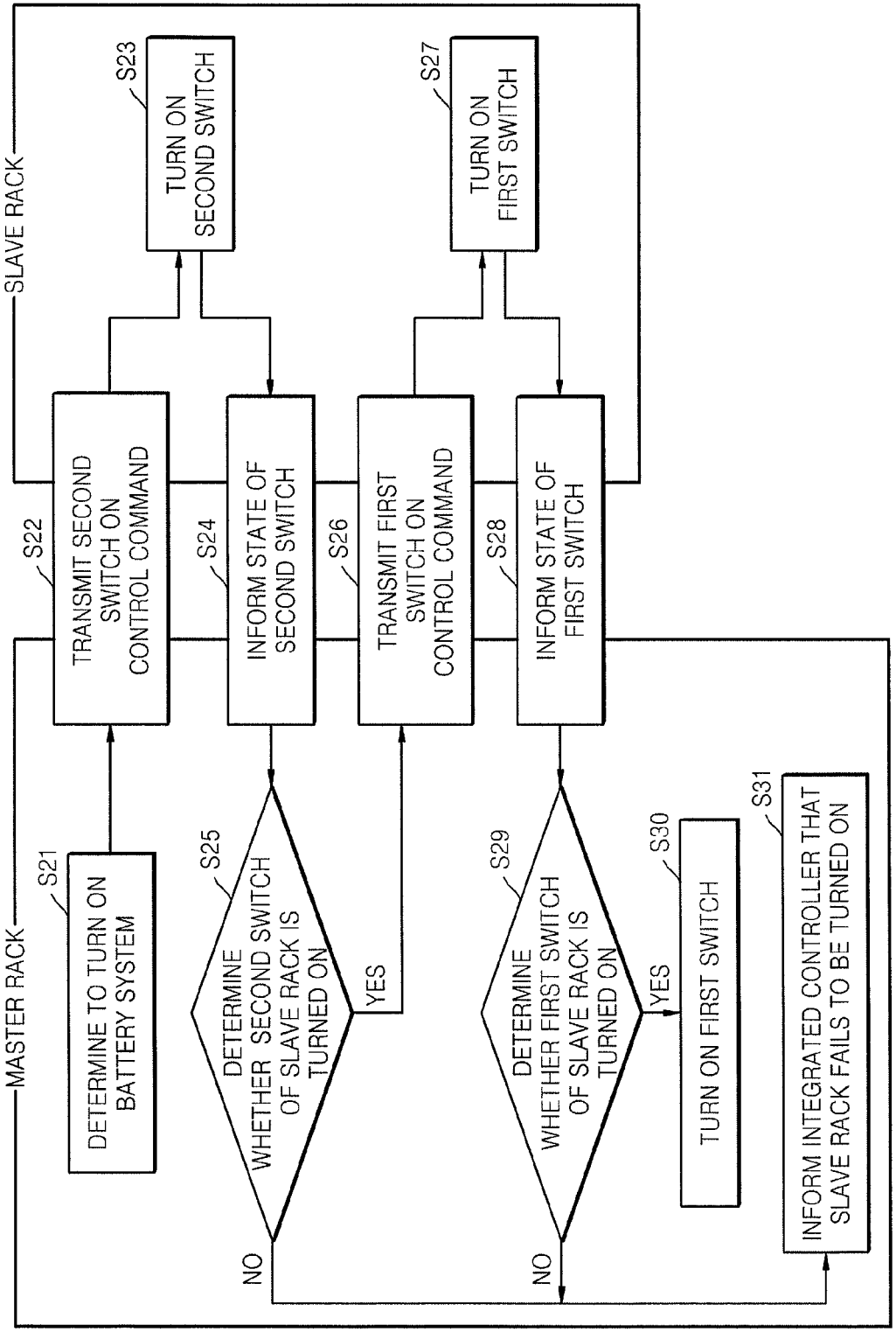

FIG. 8 illustrates a flowchart of a sequence of operations of the battery system 20, according to another exemplary embodiment.

Referring to FIGS. 6 and 8, operations of a master rack, which may correspond to the master rack 200m, and a slave rack, which may correspond to one of the slave racks 200s, and a command or data transmitted between the master rack and the slave rack are illustrated. Although one slave rack is illustrated in FIG. 8, it will be understood by one of ordinary skill in the art that a plurality of the slave racks may exist without departing from the scope of the embodiments.

In operation S21, the master BMS 210m of the master rack 200m may determine to turn on the battery system 20. For example, when the master BMS 210m receives a battery system turn on control command from the integrated controller 15, the battery system 20 starts operating, or the battery system 20 returns from an abnormal state to its normal state, the master BMS 210m may determine to turn on the battery system 20.

In operation S22, the master BMS 210m may transmit a second switch on control signal for closing the second switch 234 of the slave rack to the slave BMS 210s. In operation S23, the slave BMS 210s may turn on the second switch 234 of the slave rack in response to the second switch on control command from the master BMS 210m. In operation S24, the slave BMS 210s may inform the master BMS 210m of an opening/closing state of the second switch 234.

In operation S25, the master BMS 210m may determine whether the second switch 234 of the slave rack is closed based on the second switch 234 on control command received from the master BMS 210m. When it is determined in operation S25 that the second switch of the slave rack is closed, the sequence of operations proceeds to operation S26. In operation S26, the master BMS 210m may transmit a first switch on control command for closing the first switch 233 of the slave rack to the slave BMS 210s. When it is determined in operation S25 that the second switch 234 of the slave rack is not closed, the sequence of operations may proceed to operation S31. In operation S31, the master BMS 210m may transmit a message indicating that the slave rack 200s fails to be turned on to the integrated controller 15.

In operation S27, the slave BMS 210s may turn on the first switch 233 of the slave rack in response to the first switch on control command from the master BMS 210m. In operation S28, the slave BMS 210s may inform the master BMS 210m of an opening/closing state of the first switch 233.

In operation S29, the master BMS 210m may determine whether the first switch 233 of the slave rack is closed. When it is determined in operation S29 that the first switch 233 of the slave rack is closed, the sequence of operations proceed to operation S30. In operation S30, the master BMS 210m may close the first switch 233 of the master rack 200m. Since the slave rack 200s is already turned on to charge a mass storage capacitor between the input/output terminals T+ and T−, even when the first switch 233 of the master rack 200m is closed without closing the second switch 234 of the master rack 200m, an inrush current is not generated.

When it is determined in operation S29 that the first switch 233 of the slave rack 200s is not closed, the sequence of operations proceed to operation S31. In operation S31, the master BMS 210m may transmit a message indicating that the slave rack 200s fails to be turned on to the integrated controller 15.

Figure 9:
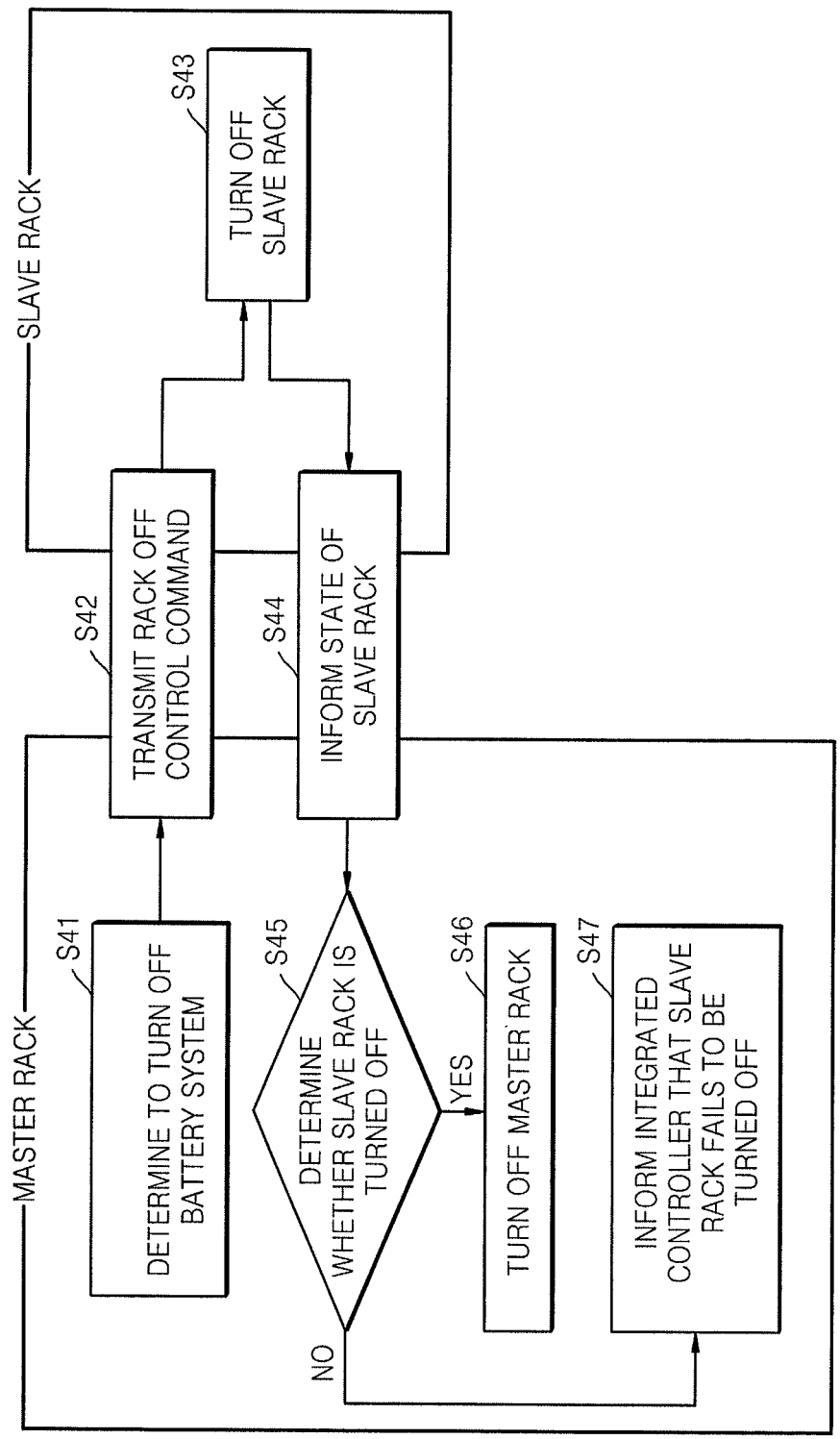

FIG. 9 illustrates a flowchart of a sequence of operations of the battery system 20, according to another exemplary embodiment.

Referring to FIGS. 6 and 9, operations of a master rack, e.g., the master rack 200m, and a slave rack, e.g., the slave rack 200s, and a command or data transmitted between the master rack and the slave rack, are illustrated. Although one slave rack is illustrated in FIG. 9, it will be understood by one of ordinary skill in the art that a plurality of the slave racks may exist without departing from the scope of the embodiments.

In operation S41, the master BMS 210m of the master rack 200m may determine to turn off the battery system 20. For example, when the master BMS 210m receives a battery system turn off control command from the integrated controller 15, the battery system 20 stops operating, or abnormality occurs in the battery system 20, the master BMS 210m may determine to turn off the battery system 20.

In operation S42, the master BMS 210m may transmit a rack off control command for turning off the slave rack to the slave BMS 210s. In operation S43, the slave BMS 210s may turn off the slave rack in response to the rack off control command from the master BMS 210m. As described above, the slave BMS 210s may open the first switch 233 of the slave rack 200s.

In operation S44, the slave BMS 210s may inform that the slave rack 200s is turned off. The slave BMS 210s may transmit information about a state of the slave rack 200s to the master BMS 210m.

In operation S45, the master BMS 210m may determine whether the slave rack 200s is turned off by using the information about the state of the slave rack 200s transmitted from the slave BMS 210s.

When it is determined in operation S45 that the slave rack 200s is turned off, the sequence of operations proceed to operation S46. In operation S46, the master BMS 210m may turn off the master rack 200m. When it is determined in operation S45 that the slave rack 200s is not turned off, the sequence of operations proceed to operation S47. In operation S47, the master BMS 210m may transmit a message indicating that the slave rack 200s fails to be turned off to the integrated controller 15.

By way of summation and review, battery systems may be supplied with an external power source, may store the supplied power, and may externally supply the stored power. Battery systems may be variously designed according to the amount of power consumed by loads. Efficiency with respect to managing battery systems to stably operate the battery systems is sought.

Embodiments relate to an energy storage system in which a master battery management system communicates with slave battery management systems, which control a plurality of battery packs that are in connected in parallel to efficiently manage and stably operate the battery system.

The particular implementations shown and described herein are illustrative examples and are not intended to otherwise limit the scope of the embodiments in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential unless the element is specifically described as "essential" or "critical".

The use of the terms "a" and "an" and "the" and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the embodiments unless otherwise claimed. Numerous modifications and adaptations will be readily apparent to those skilled in this art without departing from the spirit and scope.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system, comprising:
a master rack that includes a first battery pack and a master battery management system, the master battery management system to control the first battery pack, and
a slave rack that includes a second battery pack and a slave battery management system, the slave battery management system to control the second battery pack in response to a command from the master battery management system, and the slave battery management system reporting information as to an operational state of the second battery pack, wherein the master battery management system is to control the first battery pack after the master battery management system receives the information from the slave battery management system, wherein:
the slave battery management system is to attempt to set the state of the second battery pack as an on state based on the command from the master battery management system, and
a state of the first battery pack is to be set to an on state when the reporting information from the slave battery management system indicates the attempt to set the state of the second battery pack as the on state was successful.

2. The battery system as claimed in claim 1, wherein the slave battery management system is to set the state of the second battery pack as one of an on state or an off state, based on the command.

3. The battery system as claimed in claim 1, wherein the master battery management system is to receive the information as to the state of the second battery pack and is to set a state of the first battery pack as one of an on state or an off state based on the state of the second battery pack.

4. The battery system as claimed in claim 3, wherein the state of the first battery pack is to be set to the on state after the state of the second battery pack is set to the on state.

5. The battery system as claimed in claim 1, wherein:
the master rack and the slave rack includes a master protective circuit and a slave protective circuit, respectively, the master protective circuit includes a first switch and the slave protective circuit includes a second switch, and
the slave battery management system is to set a state of the second switch as one of an open state or a closed state, based on the command.

6. The battery system as claimed in claim 5, wherein the master battery management system is to transmit to an integrated controller information of a failure of the slave rack.

7. The battery system as claimed in claim 1, wherein the master battery management system corresponds to an overhead management system that is to control both the first battery pack and the second battery pack.

8. The battery system as claimed in claim 1, wherein the master rack is to communicate with both the first battery pack and the slave rack via a first bus.

9. The battery system as claimed in claim 8, wherein the slave rack is to communicate with the second battery pack via a second bus that is separate from the first bus.

10. The battery system as claimed in claim 9, wherein the master battery management system is to provide the command to the slave battery management based on another command from an externally connected integrated controller, the master battery management system to communicate with the externally connected integrated controller via a third bus that is separate from the first bus and the second bus.

11. The battery system as claimed in claim 8, wherein the slave rack is one of a plurality of slave racks, each of the plurality of slave racks being connected to the master rack via the first bus.

12. The battery system as claimed in claim 1, wherein the slave rack includes a protective circuit therein, the slave battery management system to determine the state of the second battery pack based on a state of a switch in the protective circuit.

13. The battery system as claimed in claim 1, wherein the slave rack includes a protective circuit therein, the protective circuit including at least one switch that is to provide intermediate information as to the state of the second battery pack to the slave battery management system.

14. The battery system as claimed in claim 13, wherein the slave rack includes a plurality of slave battery trays, the slave battery trays being connected to the protective circuit.

15. The battery system as claimed in claim 13, wherein the slave battery management system is to detect an abnormal condition in the second battery pack, and the slave battery management system is to cut off a power supply to the second battery pack via the protective circuit when the abnormal condition is detected.

16. The battery system as claimed in claim 1, wherein:
the slave rack is one of a plurality of slave racks, and
the master rack is to transmit to an externally connected integrated controller information of a failure of any one of the plurality of slave racks.

17. An energy storage system, comprising
the battery system as claimed in claim 1, and
a power conversion system that includes an integrated controller, the integrated controller being connected to the battery system, an external power generation system, an external grid, and an external load.

18. The energy storage system as claimed in claim 17, wherein, in the battery system, the master battery management system is to provide the command to the slave battery management based on another command from the integrated controller.

19. A battery system, comprising:
a master rack that includes a first battery pack and a master battery management system, the master battery management system to control the first battery pack, and
a slave rack that includes a second battery pack and a slave battery management system, the slave battery management system to control the second battery pack in response to a command from the master battery management system, and the slave battery management system reporting information as to an operational state of the second battery pack, wherein the master battery management system is to control the first battery pack after the master battery management system receives the information from the slave battery management system, wherein:

the slave rack is one of a plurality of slave racks, the plurality of slave racks including a plurality of slave battery management systems and a plurality of second battery packs, the plurality of slave battery management systems to signal the setting of the states of the plurality of second battery packs, respectively, as an on state based on the command from the master battery management system, and a state of the first battery pack is set to an on state when each of the plurality of slave battery management systems indicates the setting of the states of the plurality of second battery packs was successful.

\* \* \* \* \*